United States Patent [19]

Charlesworth

[11] 4,115,932
[45] Sep. 26, 1978

[54] PHONETICS SYSTEM AND METHOD OF TEACHING PHONETICS

[76] Inventor: Rita Charlesworth, 2214 22nd St., Newport Beach, Calif. 92660

[21] Appl. No.: 815,968

[22] Filed: Jul. 15, 1977

[51] Int. Cl.² .............................................. G09B 19/04
[52] U.S. Cl. .................................................. 35/35 J
[58] Field of Search ................... 35/35 R, 35 J, 36, 69, 35/71

[56] References Cited

U.S. PATENT DOCUMENTS

| | | | |
|---|---|---|---|
| 683,267 | 9/1901 | Froelich | 35/35 J |
| 1,732,980 | 10/1929 | Mooney | 35/35 J X |
| 2,294,539 | 9/1942 | Cuddihy | 35/35 R X |
| 3,290,800 | 12/1966 | Le Dell | 35/35 J |
| 3,407,515 | 10/1968 | Pitman | 35/35 R |
| 3,426,451 | 2/1969 | Hoffman | 35/35 R |
| 3,497,967 | 3/1970 | Lewis et al. | 35/35 R |
| 3,571,951 | 3/1971 | Siegel et al. | 35/35 R |
| 3,715,812 | 2/1973 | Novak | 35/35 J |
| 3,798,797 | 3/1974 | Mandel | 35/35 R |
| 3,823,491 | 7/1974 | Lehmann | 35/35 R |
| 3,982,333 | 9/1976 | Farmer | 35/36 |
| 4,007,548 | 2/1977 | Cytanovich | 35/35 R |

*Primary Examiner*—William H. Grieb
*Attorney, Agent, or Firm*—Patrick F. Bright

[57] ABSTRACT

A phonetics system for the English language includes a plurality of tiles that provide a progressive, systematic approach to learning the sounds of English words by associating vowels associated with the sounds of vowels alone, vowels in digraphs, vowels in diphthongs, vowels in vowel/consonant combinations, vowels in vowel combinations and vowels in vowel patterns with colors that uniquely identify each of these vowel sounds as they commonly occur in English words.

9 Claims, 6 Drawing Figures

U.S. Patent Sept. 26, 1978 4,115,932
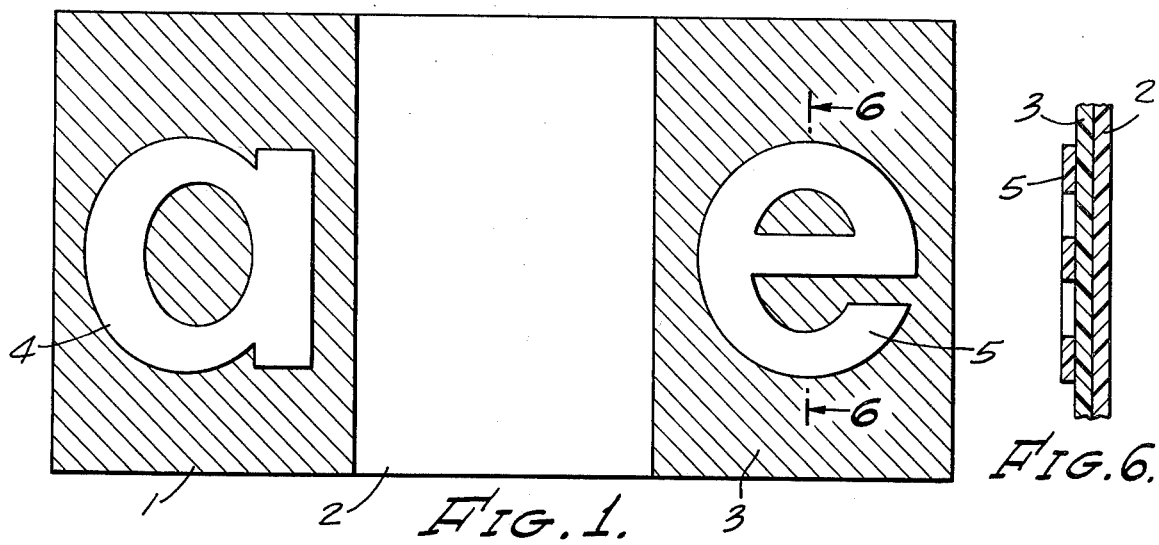
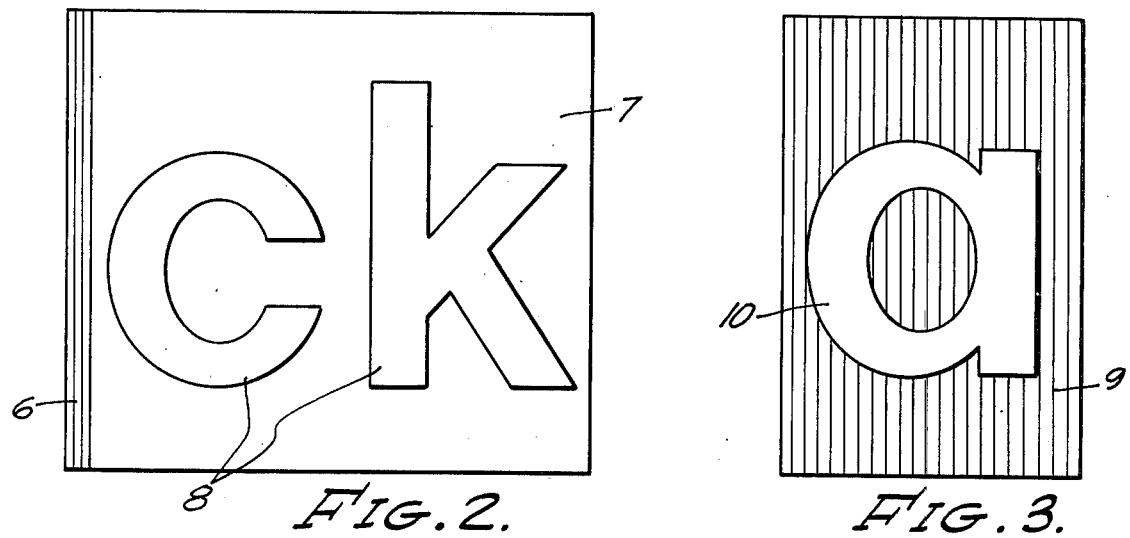
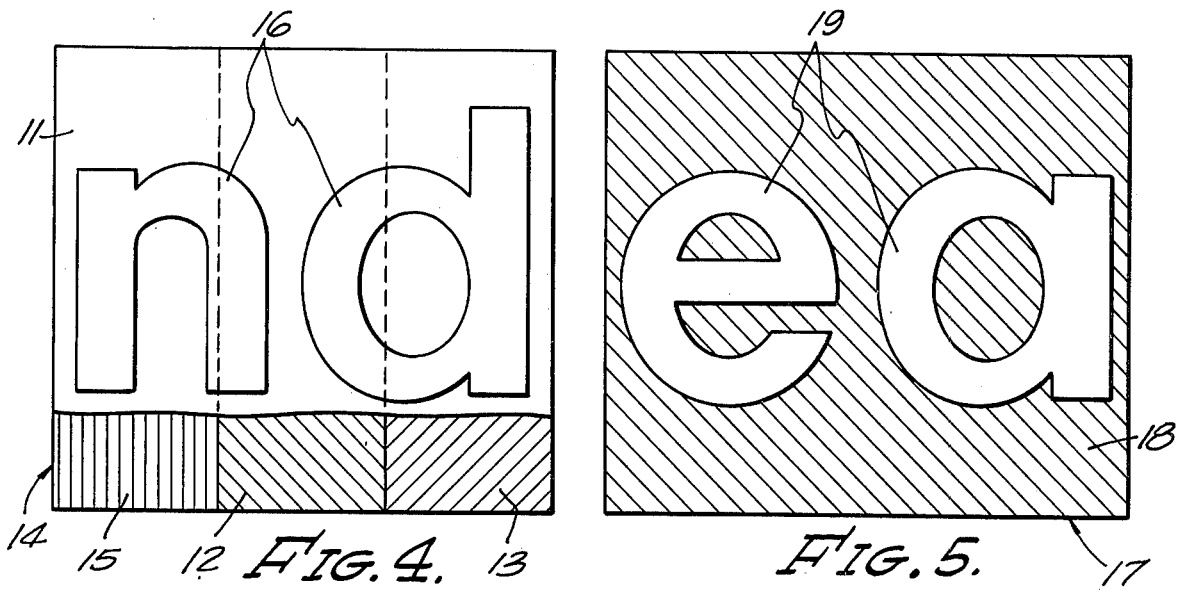

PHONETICS SYSTEM AND METHOD OF TEACHING PHONETICS

This invention relates to a phonetics system for the English language, and to a method for teaching phonetics in the English language.

In accordance with this invention, a phonetics system for the English language includes a plurality of tiles that progressively and systematically associate the sounds of vowels along and in combination with other vowels, consonants or both, as they commonly appear in English words, with colors uniquely identifying each of the vowel sounds. In this specification and claims, the term "tile" refers to objects such as plates bearing one or more letters or combinations of letters useful in teaching phonetics under the system of this invention and including one or more color markings uniquely associated with the sound of the vowels appearing on such tiles, vowel sounds that are commonly associated with the letters or letter combinations appearing on such tiles, or both.

The plurality of tiles in the system includes vowel tiles that associate a specific color with short single vowel sounds, vowel tiles that associate a second color with long single vowel sounds, digraph tiles bearing the color of vowels that commonly appear in English words with such digraphs, vowel/digraph combination tiles bearing the colors associated with the sounds the vowels in such combinations commonly have in English words, and vowel combination tiles bearing color markings uniquely associated with the vowel sound or sounds such vowel combinations commonly have in English words. Where the vowel sound for the vowel on, or commonly associated with the letter or letters on, one tile is the same as the vowel sound for the vowel on, or commonly associated with the letter or letters on, another tile, the color (or colors, if more than one vowel sound is common in various English words) is identical. Where ambiguity arises in associating a color with more than one letter or letter combination, the tile may also bear clarifying indicia, preferably on the reverse side.

Single short and long vowel tiles simply carry one vowel and a single color denoting long or short. Preferably, red means short, green means long.

Vowel combination tiles may bear two or more color markings, denoting that the vowel combination may have the sounds associated with these different colors in different English words. Digraph tiles bear those colors associated with the vowel sounds that commonly appear with such digraphs in English words. Vowel/digraph combination tiles bear those colors associated with the sound the vowels in these vowel/digraph combinations commonly have in English words. Digraph and vowel/digraph combination tiles may also include a distinctive color marking indicating that such digraphs and vowel/digraph combinations commonly appear at the end of English words.

The system includes diphthong tiles bearing a distinctive color denoting that the diphthong has a unique vowel sound that is neither short nor long. Where possible, the system provides for the use of distinctive colors whose English names include the sound of the diphthong. For example, the diphthong "oo" is associated with the color blue, which includes the sound of this diphthong. The system also includes vowel/consonant combination tiles bearing color markings denoting that the vowel sounds in such combinations are unique. Again, where the vowel/consonant combination appears in the name of a color in the English language, that color is used to denote the vowel sound the vowel has in such combinations.

The system also includes vowel pattern tiles, which include two or more vowels separated by spaces where consonants or consonant combinations commonly appear in English words. In such vowel pattern tiles, the first vowel is associated with a color that bespeaks the name of the vowel (long vowel sound) in such patterns as they commonly appear in English words. The second vowel is silent, but essential in forming the long sound of the first vowel.

This invention also provides a method for teaching phonetics in the English language in a progressive, systematic fashion. The method includes associating the names of the consonants and vowels in the English alphabet with the letters in that alphabet, preferably using tiles bearing raised letters to permit tracing the shape of the letter while learning its name. Long and short vowel sounds are associated with colors arbitrarily assigned to long and short vowel sounds, respectively. Thus, for example, the short vowel sounds may be arbitrarily associated with the color red, which includes the short sound of the vowel "e". This strengthens the association of the color with the short vowel sound. Similarly, long vowel sounds are associated with a color unique to those sounds. For example, the color associated with the long vowels may be green, in which the long "e" vowel sound appears. Associating the simple English words "I" and "you" with the color assigned to long vowel sounds and combining short and long vowel sounds with consonants to form simple words permits formation of phonetically accurate, simple sentences.

The method provides for association of digraphs with the colors assigned to vowel sounds commonly appearing with such digraphs in English words. Tiles bearing digraphs commonly appearing in English words that include colors associated with the vowel sounds that commonly appear with such digraphs in English words facilitates this. Thus, for example, the digraphs "ck", "mp", "nk", "sk", "ll", "ff", "ss", "tch", "nch", and "ng" are commonly associated with short vowel sounds in English words. Thus, if the short vowel sounds are associated with the color red, tiles bearing these digraphs would also be marked red to indicate the association. Similarly, tiles bearing vowel/digraph combinations should be marked with the color or colors associated with the sounds the vowel commonly has in English words that include the combination. The marking precedes the digraph to indicate that the vowel is placed before the digraph. Thus, the vowel/digraph combination "ing" should be associated with the color assigned to the short vowel sound for the letter "i". Where the digraphs or combinations commonly appear at the end of English words, they are also associated with an arbitrarily chosen color uniquely indicating this.

In English words, some vowels and vowel combinations have neither a short nor a long sound identical to a long or short single vowel. Such vowels and combinations are associated with colors unique to those sounds, preferably colors whose English names include the sound. Thus, for example, the sound of the letter "o" in the word "do" approximate the vowel sound in the color blue, and association of blue with this vowel sound reinforces the concept. Similarly, in some vowel/consonant combinations, the vowel sound is not the same as a single long or short vowel sound. A unique color is associated with such sounds if no other vowel sound associated with a color approximates the vowel sound in such a combination. Thus, the letter "y" has a long "i" sound in some words, long "e" sound in others. Using the color for long single vowels obviates the need for a different color.

Vowel combinations such as "ai" and "ay" and other vowel combinations that have the long or short sounds of single vowels are preferably associated with the same color assigned to the single short or long vowel having the same sound. By contrast, a vowel combination such as "oy" in words such as "toy" has a unique sound that appears in the color turquoise. This method associates that color with this vowel combination.

In English, some vowel/consonant combinations have differing vowel sounds depending upon the word in which the combination appears. Thus, for example, the combinatoin "or" has one sound in words such as orange and horse and more, and quite a different sound in words such as actor and tractor. Accordingly, association of this vowel/consonant combination with both orange and purple strengthens the association the letters of the combination and the sound the combination has in such words.

Vowel combinations that have the sound of a single long vowel or a single short vowel are associated with the color denoting the sound associated with the single vowel. Thus, combinations such as "ee" and "ea" are associated with the same color associated with the long vowel sound for "e".

Vowel/consonant combinations such as "er", "ir", and "ur" are all associated with the color purple to denote the sound these combinations commonly have in many English words. Because tiles bearing the association of the color with these letter combinations plainly show the differences in spelling of the combinations, such tiles underscore the fact that vowel/consonant combinations that differ in spelling may and often do have the same sounds in many English words.

The method of this invention also provides for associating vowel patterns with the vowel sounds where such patterns commonly appear in English words. Such patterns, where embodied in tiles, for example, include gaps to denote spaces where consonants or consonant combinations commonly appear with such patterns in English words. Thus, for example, a tile may incldue the pattern "a e", "i e" or "o e", each blank indicating that one or more consonants commonly appear between the two vowels in the pattern.

Other vowel combinations and vowel/consonant combinations that commonly appear in English words have sounds that appear in the English names of other colors. Thus, for example, the combinations "ow" and "ou" have sounds in many words that duplicate the sound of the combination "ow" in the color brown. Thus, the color brown may be associated with these combinations. Because the combination "ou" may also have the sound of the long "o", however, this combination may also be associated with the color used to denote the long sound of the vowel "o".

Some digraphs that commonly appear with the letter combinations "ou" and "ow" may also bear the brown marking to denote the association of these digraphs with this sound in many English words. Thus, the consonant combination "nd" may be associated with brown and with the color for short vowel sounds. Similarly, the vowel/consonant combinations "ew" and the vowel combination "ui" have different vowel sounds depending on the English words in which they appear. The combination "ew" may be associated with the colors for long vowel sounds and with the color used for the diphthong "oo", preferably blue. The combination "ui" may be associated with the color for the short vowel sounds and with blue to denote the diphthong sound this combination has in many English words such as fruit. The vowel combination "ea" may be associated with the colors denoting short vowel sounds, long vowel sounds, and with the color purple because of the frequent appearance of this vowel combination in English words having the "er" sound.

The system and method of this invention combine to permit step-by-step instruction in the sounds and vowel and vowel/consonant combinations used in nearly all words. After each new sound and combination is learned, the construction of phrases and sentences in known ways will reinforce the learning, with the use of the same color or color combinations providing the common thread throughout the process.

The system and method of this invention are illustrated in part by the drawing accompanying this application in which:

FIG. 1 shows a vowel pattern tile;

FIG. 2 shows a digraph tile bearing a color marking denoting association with short vowel sounds;

FIG. 3 shows a single short vowel tile bearing a color marking denoting the short vowel sound;

FIG. 4 shows a digraph tile bearing color markings denoting the association of this digraph with short or long vowel sounds or with the sound of the letters "ow" in the word "brown";

FIG. 5 shows a tile bearing a vowel combination and a color marking indicating that the vowel combination has the sound of a single long vowel; and FIG. 6 shows a sectional view taken along line 6—6 of FIG. 1.

FIG. 1 shows a vowel pattern tile having a colorless base plate 2 surmounted by a pair of vowel-bearing tiles 1 and 3. The gap 2 between vowel-bearing tiles 1 and 3 indicates that a consonant or combination of consonants commonly appears between these vowels in English words. Tile 1 includes the vowel "a" at 4, and is marked with the color associated with the long vowel sound. Similarly, tile 3 bears the vowel "e" at 5 and is similarly marked with a color associated with the long vowel sound. FIG. 6 shows a sectional view of the letter appearing on panel 3 and illustrates that the letter is preferably raised to permit tracing the letter with the finger.

FIG. 2 shows a digraph tile bearing the digraph "ck" at 8 mounted on a white background 7, and including the red color marking 6 indicating that this digraph is commonly associated with short vowels in English words.

FIG. 3 shows a short vowel sound tile 9 bearing the red color marking associated with the short vowel sounds, surmounted by the raised letter "a" at 10.

FIG. 4 shows the digraph "nd" at 16 mounted on white or colorless tile 11, which includes color markings 15 (red), 12 (green) and 13 (brown) indicating that this digraph may be associated with short or long vowel sounds or with words that include the sound of the letters "ow" in the color brown.

FIG. 5 shows the vowel combination tile 17 bearing the vowel combination "ea" at 19 fashioned of raised letters mounted on green colored panel 18. The color green indicates that the vowel combination "ea" has the same sound as the long vowel sound of the letter "e" in the word green.

What is claimed is:

1. A phonetics system for the English language including a plurality of tiles, each tile including one or more letters that have a sound denoted by a color marking on said tile, said plurality including vowel tiles associating one color with short single vowel sounds, vowel tiles associating a second color with long single vowel sounds, digraph tiles bearing the color of vowels that commonly appear in English words with said digraph, vowel/digraph combination tiles bearing the colors associated with the sound of the vowel in said vowel/digraph combination in English words, and tiles bearing vowel combinations marked with the colors associated with the vowel sounds said vowel combinations commonly have in English words.

2. The system of claim 1 wherein said vowel combination tiles include two or more color markings to denote that the vowel combination may have the sounds associated with said two or more color markings in different English words.

3. The system of claim 1 wherein the tiles bearing digraphs and the tiles bearing vowel/digraph combinations that commonly appear at the end of English words bear a distinctive color mark that so indicates.

4. The system of claim 1 further comprising diphthong tiles bearing a distinctive color denoting that said diphthong has a unique vowel sound.

5. The system of claim 1 further comprising vowel/consonant combination tiles bearing colors denoting that the vowel sounds in said vowel/consonant combinations are unique.

6. The system of claim 5 wherein the sound of the vowels in the vowel/consonant combination tiles appears in the English word for the color on said vowel/consonant combination tile.

7. The system of claim 5 wherein the vowel/consonant combination tiles include a color denoting that the vowel in said combination has a diphthong sound.

8. The system of claim 1 further comprising vowel pattern tiles, each vowel in said pattern bearing the color denoting the sound associated with said vowel in that combination, said vowel pattern tiles including spaces between vowels where a consonant or consonant combination commonly appears in English words.

9. A method for teaching phonetics in the English language comprising associating vowel sounds with colors unique to each vowel sound, associating digraphs commonly found in English words with the colors of the vowel sounds that commonly appear in English words with said digraphs, associating the sounds of diphthongs in English words to colors uniquely identified with said diphthongs, and associating vowel/consonant combinations commonly appearing in English words with colors whose names in the English language commonly include the sound of the combination with which the color is associated.

* * * * *